United States Patent
Yoon

(10) Patent No.: US 7,738,842 B2
(45) Date of Patent: Jun. 15, 2010

(54) APPARATUS FOR PROTECTING RECEIVER CIRCUIT IN TIME DIVISION DUPLEXING WIRELESS COMMUNICATION SYSTEM

(75) Inventor: Hyun-Su Yoon, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 934 days.

(21) Appl. No.: 11/508,570

(22) Filed: Aug. 23, 2006

(65) Prior Publication Data
US 2007/0049225 A1 Mar. 1, 2007

(30) Foreign Application Priority Data
Aug. 23, 2005 (KR) .................... 10-2005-0077252

(51) Int. Cl.
*H04B 1/44* (2006.01)
(52) U.S. Cl. ............... 455/83; 455/78; 455/73; 455/82; 257/347; 333/101; 327/365
(58) Field of Classification Search ............ 455/83, 455/78, 73, 82; 257/347, 348, 349; 333/101, 333/103, 109; 327/365, 379, 389
See application file for complete search history.

(56) References Cited

U.S. PATENT DOCUMENTS

| | | | | |
|---|---|---|---|---|
| 5,081,673 A * | 1/1992 | Engelke et al. | ...... | 379/93.09 |
| 5,239,686 A * | 8/1993 | Downey | ...... | 455/78 |
| 5,351,288 A * | 9/1994 | Engelke et al. | ...... | 379/93.09 |
| 6,175,747 B1 * | 1/2001 | Tanishima et al. | ...... | 455/562.1 |
| 6,510,309 B1 * | 1/2003 | Thompson et al. | ...... | 455/78 |
| 6,784,837 B2 * | 8/2004 | Revankar et al. | ...... | 342/372 |
| 6,882,829 B2 * | 4/2005 | Mostov et al. | ...... | 455/83 |
| 7,428,230 B2 * | 9/2008 | Park | ...... | 370/345 |
| 2003/0190895 A1 * | 10/2003 | Mostov et al. | ...... | 455/78 |
| 2006/0035618 A1 * | 2/2006 | Pleasant | ...... | 455/323 |
| 2007/0111686 A1 * | 5/2007 | Lee | ...... | 455/127.3 |
| 2007/0155344 A1 * | 7/2007 | Wiessner et al. | ...... | 455/78 |
| 2007/0184790 A1 * | 8/2007 | Gilberton et al. | ...... | 455/127.1 |
| 2007/0190952 A1 * | 8/2007 | Waheed et al. | ...... | 455/114.3 |
| 2007/0218852 A1 * | 9/2007 | Huynh | ...... | 455/217 |
| 2007/0291668 A1 * | 12/2007 | Duan | ...... | 370/280 |
| 2008/0089252 A1 * | 4/2008 | Choi | ...... | 370/280 |
| 2008/0259846 A1 * | 10/2008 | Gonikberg et al. | ...... | 370/328 |
| 2008/0299913 A1 * | 12/2008 | Han et al. | ...... | 455/83 |
| 2009/0004981 A1 * | 1/2009 | Eliezer et al. | ...... | 455/127.1 |

FOREIGN PATENT DOCUMENTS

| | | |
|---|---|---|
| KR | 10-1998-0085582 | 12/1998 |
| KR | 1020040104177 | 12/2004 |
| KR | 1020060010677 | 2/2006 |
| KR | 1020060041499 | 5/2006 |
| KR | 1020060066198 | 6/2006 |

* cited by examiner

*Primary Examiner*—Minh D Dao
(74) *Attorney, Agent, or Firm*—The Farrell Law Firm, LLP

(57) ABSTRACT

Provided is an apparatus for protecting a receiver circuit in a Time Division Duplexing (TDD) wireless communication system. In the protecting apparatus, an antenna switch transmits an output signal of a power amplifier to an antenna feed line and transmits an output signal of the antenna feed line to a low noise amplifier. A status monitor monitors a status of the antenna switch. A mode determiner disables an amplification operation of the power amplifier when a status monitoring signal output from the status monitor indicates an RX mode.

20 Claims, 6 Drawing Sheets

APPARATUS FOR PROTECTING RECEIVER CIRCUIT IN TIME DIVISION DUPLEXING WIRELESS COMMUNICATION SYSTEM

PRIORITY

This application claims priority under 35 U.S.C. §119 to an application entitled "Apparatus for Protecting Receiver Circuit in Time Division Duplexing Wireless Communication System" filed in the Korean Intellectual Property Office on Aug. 23, 2005 and allocated Serial No. 2005-77252, the contents of which are incorporated herein by reference.

BACKGROUND OF THE INVENTION

1. Field of the Invention

The present invention relates generally to a radio frequency (RF) transceiver of a Time Division Duplexing (TDD) wireless communication system, and in particular, to an apparatus for protecting a Low Noise Amplifier of a receiver block.

2. Description of the Related Art

Generally, TDD wireless communication systems separate a transmission and a reception by time division of the same frequency. In the TDD wireless communication system, a transmit/receive antenna switch (TRAS) performs a switching function between a high power RF transmit (TX) signal and a low power RF receive (RX) signal. The TRAS protects a low noise amplifier (LNA) by interrupting a transmission power supplied to a receiver in a TX mode and reduces noise introduced from a transmitter in an RX mode.

FIG. 1 is a block diagram of an RF transceiver in a conventional TDD wireless communication system. Referring to FIG. 1, the RF transceiver includes a TDD controller 100, a transmitter block (TXB) 110, a power amplifier block (PAB) 120, a receiver block (RXB) 130, an LNA 140, a TRAS 150, a front end block (FEB) 160, and antenna 170.

The TDD controller 100 generates TDD control signals to the respective blocks according to TX/RX modes. In FIG. 1, a reference symbol "TCTX" represents a TDD control signal for the TXB 110 and will be referred to as a first control signal. A reference symbol "TCPA" represents a TDD control signal for the PAB 120 and will be referred to as a second control signal. A reference symbol "TCAS" represents a TDD control signal for the TRAS 150 and will be referred to as a third control signal. Also, a reference symbol "TCRX" represents a TDD control signal for the RXB 130 and will be referred to as a fourth control signal.

In the TX mode, the TXB 110 converts a baseband modulated signal input from a modem (not shown) into an RF signal according to the first control signal TCTX, and the PAB 120 power-amplifies a TX signal received from the TXB 110.

The TRAS 150 transmits a signal from the PAB 120 to the FEB 160 in the TX mode, and transmits an output signal of the FEB 160 to the LNA 140 in the RX mode. In the TX mode, the TRAS 150 protects the receiver circuit from a high power TX signal by isolating the receiver circuit from a TX path. In the RX mode, the TRAS 150 blocks a noise signal transmitted from the PAB 120 by isolating the transmitter circuit from an RX path. The TRAS 150 may be implemented using an RF switch or a circulator.

The FEB 160 includes a band pass filter (BPF). The FEB 160 performs a service band filtering operation on a TX signal received from the TRAS 150, and outputs the filtered TX signal through the antenna 170. Also, the FEB 160 performs a service band filtering operation on an RX signal received from the antenna 170, and outputs the filtered RX signal to the TRAS 150.

The LNA 140 amplifies the signal output from the TRAS 150 while suppressing its noise. In the RX mode, the RXB 130 converts an RF signal received from the LNA 140 into a baseband signal according to the fourth control signal TCRX, and outputs the baseband signal to the modem.

FIG. 2 illustrates a relationship between the TDD control signal and the TX/RX RF signal.

Referring to FIG. 2, the third control signal TCAS for controlling the operation of the TRAS 150 maintains a high state during a transmit time (TT) period and changes to a low state at a time point when the TT period is ended. Next, the third control signal TCAS maintains a low state during a receive guard time (RGT) period and a receive time (RT) period and changes into a high state at a time point when the RT period is ended. Then, the third control signal TCAS maintains a high state during the transmit guard time (TGT) period and the TT period and changes to a low state at a time point when the TT period is ended.

The TGT period is a guard time necessary for the blocks of the system to perform mode switching when the system switches from the RX mode to the TX mode. The RGT period is a guard time necessary for the blocks of the system to perform mode switching when the system switches from the TX mode to the RX mode.

The high power RF TX signal is transmitted while the third control signal TCAS is in the high state. On the other hand, the low power RF RX signal is transmitted while the third control signal TCAS is in the low state.

To operate the TDD system normally, the blocks of the system have to complete mode switching within the TGT period and the RGT period. All the blocks on the TX path have to maintain the normal state during the TT period, and all the blocks on the RX path have to maintain the normal state during the RT period. That is, to achieve the normal path switching of the TDD system, the TDD control signals for controlling the respective blocks have to be in the normal state, the blocks on the TX path have to switch to the TX mode within the TGT period, and the blocks on the RX path have to switch to the RX mode within the RGT period. In addition, the TRAS 150 has to secure a sufficient isolation level between the TX path and the RX path.

In mode switching, the blocks constructing the TX path and the RX path in the TDD system of FIG. 1 have different mode switching times and delay times of the RF signal. Therefore, the TDD controller 100 has to generate the TDD control signals TCTX, TCPA, TCAS and TCRX, considering the mode switching time of the respective blocks and the delay time of the RF signal.

However, when there occur problems in the TDD control signals generated from the TDD controller 100, or when there occur problems in the control connection between the TDD controller 100 and a corresponding block, the isolation degree between the high power TX signal and the highlow power RX signal cannot be sufficiently secured by the asynchronous operation of the blocks. In this case, the receiver block, especially the LNA 140, may be damaged by the high power RF TX signal.

FIG. 3 illustrates the high power RF TX signal that is introduced into the RX path when the third control signal TCAS is abnormal.

Referring to FIG. 3, the PAB power-amplifies an input signal while the second control signal TCPA is in a high state, but does not perform the amplification operation while the second control signal TCPA is in a low state. When the third control signal TCAS is in a high state, the TRAS 150 operates in the TX mode to transmit the output of the PAB 120 to an antenna feed line, and isolates the RX mode from the TX mode. On the other hand, when the third control signal TCAS is in a low state, the TRAS 150 operates in the RX mode to transmit signals supplied through the antenna feed line to the LNA 140.

If the high power RF signal from the PAB 120 is transmitted to the TRAS 150 during the RT period of the third control signal TCAS because the TT period and the RT period of the second and third control signals TCPA and TCAS do not coincide with each other, the TRAS 150 does not operate in the RX mode. Therefore, the high power RF signal is introduced into the LNA 140. In this case, the LNA is permanently damaged.

In practice, these problems often occur when the system is initially installed, the blocks are replaced or additionally installed so as to extend frequency allocation (FA), or the blocks are assembled/disassembled for their inspection. Therefore, there is a demand for an apparatus that can protect the receiver circuit even in an abnormal state.

SUMMARY OF THE INVENTION

An object of the present invention is to substantially solve at least the above problems and/or disadvantages and to provide at least the advantages below. Accordingly, an object of the present invention is to provide an apparatus for transmitting/receiving high power RF signals in a TDD wireless communication system.

Another object of the present invention is to provide an apparatus for protecting an LNA of a receiver block in a TDD wireless communication system using high power.

A further object of the present invention is to provide an apparatus for protecting an LNA from being damaged due to a mismatch between TDD control signals in a TDD wireless communication system.

Still another object of the present invention is to provide an apparatus for protecting an LNA from being damaged due to a mismatch between the TX signal and TDD control signals in a TDD wireless communication system.

According to one aspect of the present invention, an apparatus for protecting a receiver circuit in a TDD wireless communication system includes an antenna switch for transmitting an output signal of a power amplifier to an antenna feed line and transmitting an output signal of the antenna feed line to a low noise amplifier; a status monitor for monitoring a status of the antenna switch; and a mode determiner for disabling an amplification operation of the power amplifier when a status monitoring signal output from the status monitor indicates an RX mode.

The mode determiner enables the amplification operation of the power amplifier in a case where both a TDD control signal for controlling the power amplifier and the status monitoring signal indicates TX mode, and the mode determiner disables the amplification operation of the power amplifier in the other cases.

The mode determiner disables the amplification operation of the power amplifier by turning off a gate bias of the power amplifier.

The antenna switch includes a circulator for transmitting the output signal of the power amplifier to the antenna feed line and transmitting the output signal of the antenna feed line to a transmission line; a transmission line connected between the circulator and the low noise amplifier; a plurality of pin diodes shunted at predetermined locations of the transmission lines; and a switch controller for controlling bias of the plurality of pin diodes according to a TDD control signal.

The status monitor detects a diode drive signal generated from the switch controller and provides the detected diode drive signal to the mode determiner.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinafter, a description will be made of an apparatus for protecting an LNA from being damaged due to a mismatch between TDD control signals in a TDD wireless communication system using high power.

Figure 1:
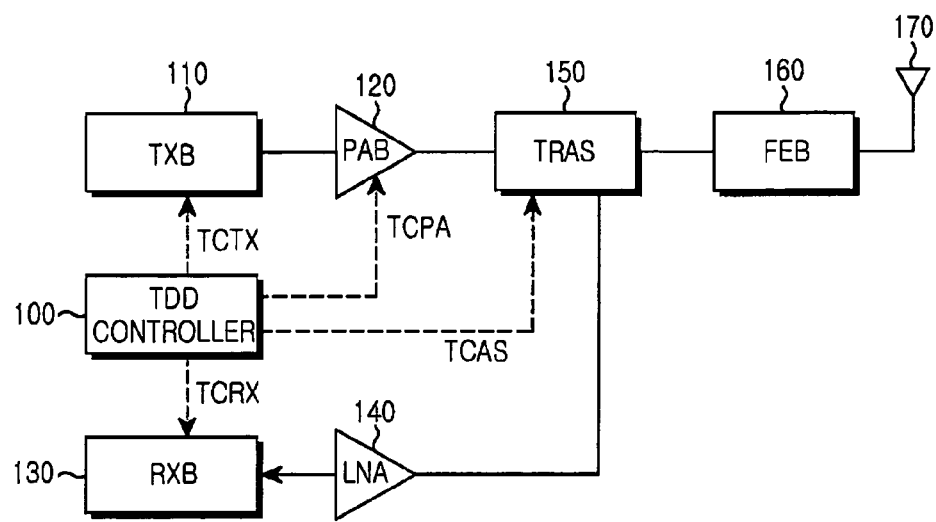
FIG. 1 is a block diagram of an RF transceiver in a conventional TDD wireless communication system.
Figure 2:
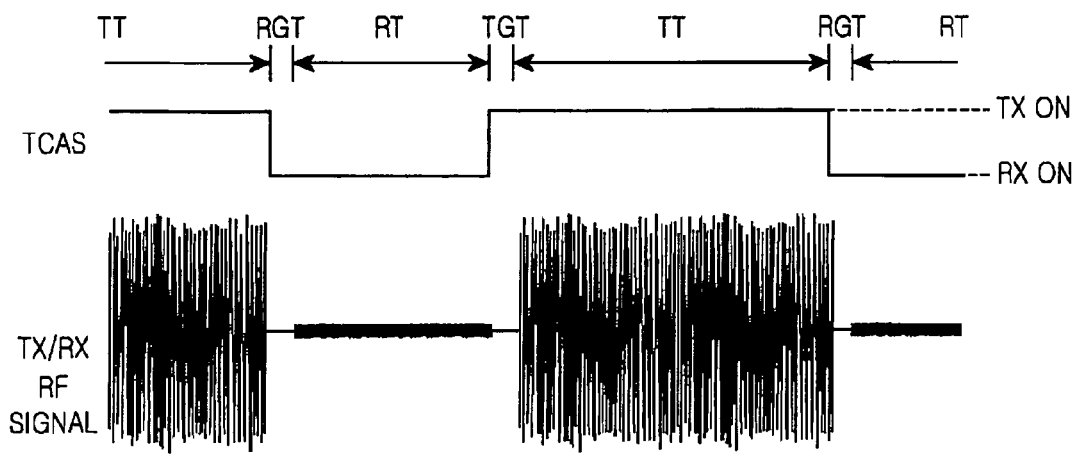
FIG. 2 illustrates a relationship between TDD control signals and TX/RX RF signals.
Figure 3:
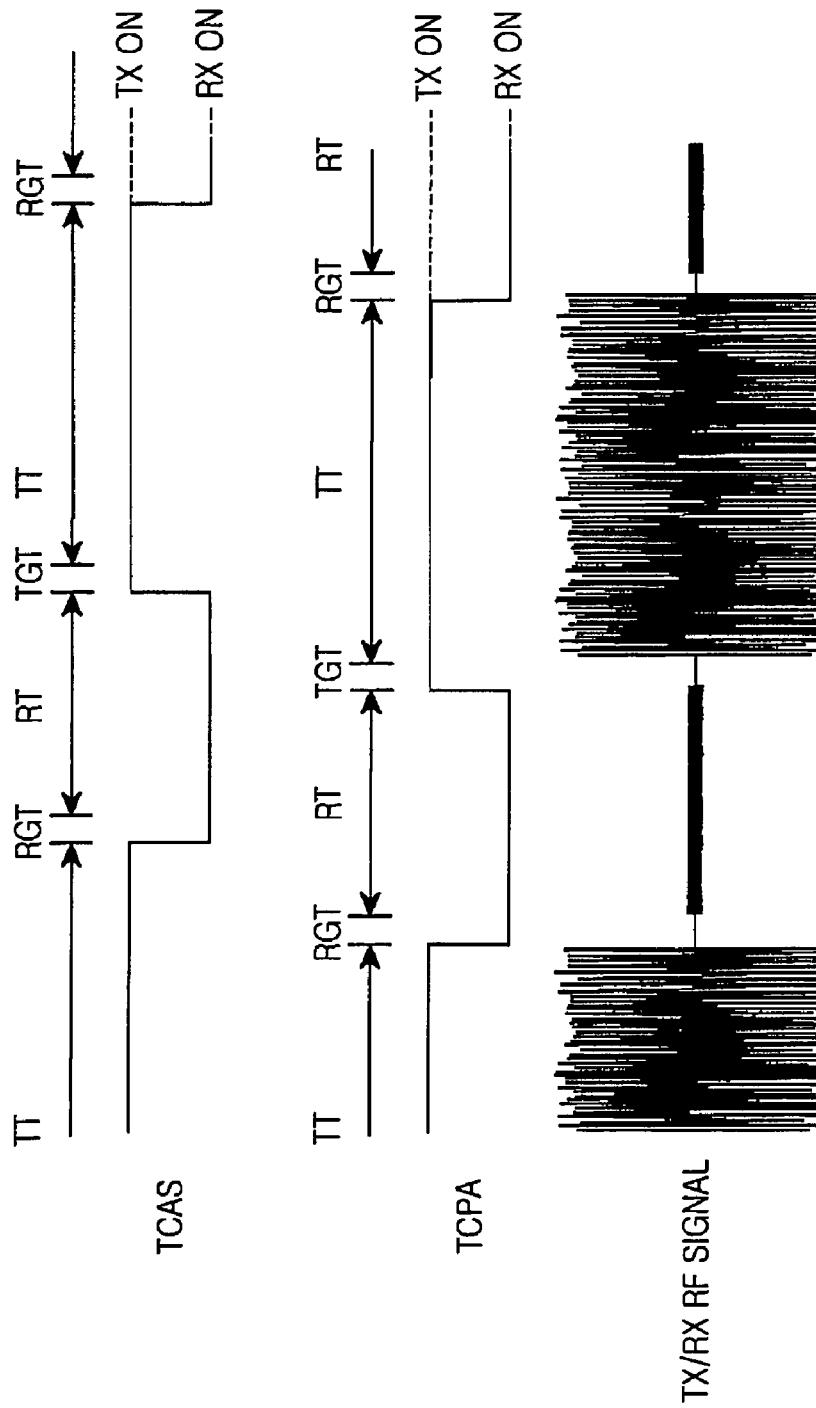
FIG. 3 illustrates a high power RF TX signal that is introduced into an RX path when a control signal (TCAS) is abnormal.
Figure 4:
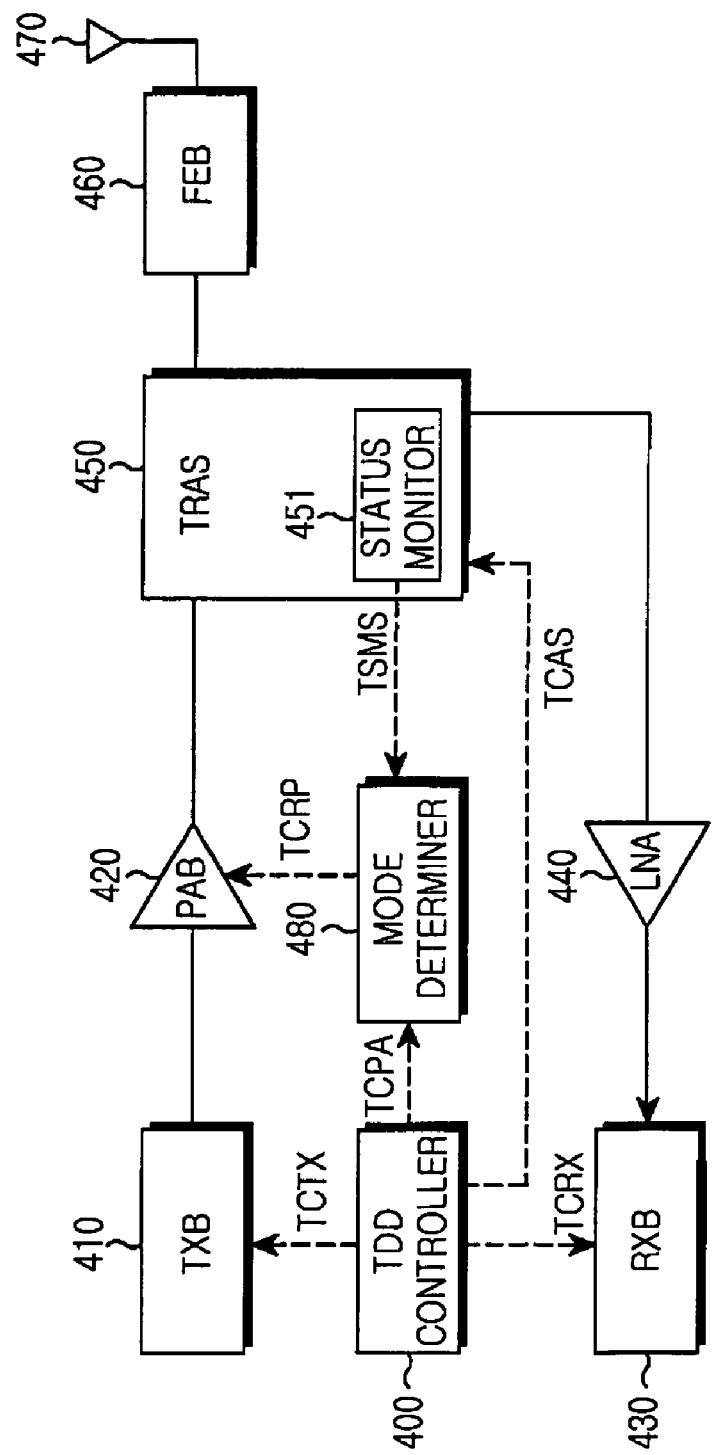
FIG. 4 is a block diagram of an RF transceiver in a TDD wireless communication system according to the present invention.

FIG. 4 is a block diagram of an RF transceiver in a TDD wireless communication system according to the present invention.

Referring to FIG. 4, the RF transceiver includes a TDD controller 400, a transmitter block (TXB) 410, a power amplifier block (PAB) 420, a receiver block (RXB) 430, a low noise amplifier (LNA) 440, a TRAS 450, a front end block (FEB) 460, an antenna 470, and a mode determiner 480.

The TDD controller 400 generates TDD control signals to the respective blocks according to TX/RX modes. In FIG. 4, a reference symbol "TCTX" represents a TDD control signal for the TXB 410 and will be referred to as a first control signal. A reference symbol "TCPA" represents a TDD control signal for the PAB 420 and will be referred to as a second control signal. A reference symbol "TCAS" represents a TDD control signal for the TRAS 450 and will be referred to as a third control signal. A reference symbol "TCRX" represents a TDD control signal for the RXB 430 and will be referred to as a fourth control signal. Also, a reference symbol "TCRP" represents a TDD control signal for receiver protection, which is supplied from the mode determiner 480 to the PAB 420, and will be referred to as a fifth control signal.

In the TX mode, the TXB 410 converts a baseband modulated signal input from a modem (not shown) into an RF signal according to the first control signal TCTX.

The mode determiner 480 determines a mode according to the second control signal TCPA from the TDD controller 400 and a TRAS status monitoring signal TSMS from a status monitor 451 of the TRAS 450. The mode determiner 480 generates the fifth control signal (or a PAB on/off signal) TCRP to the PAB 420 according to the determined mode. The mode determiner 480 enables the amplification operation of the PAB 420 only when the second control signal TCPA and the TRAS status monitoring signal TSMS are both in the TX mode. That is, even if the second control signal TCPA from the TDD controller 400 is in the TX mode, the mode determiner 480 disables the amplification operation of the PAB 420 by turning off a gate bias of the PAB 420 when the status of the TRAS 450 is in the RX mode.

The TRAS 450 transmits a signal from the PAB 420 to the FEB 460 in the TX mode according to the third control signal TCAS. On the other hand, the TRAS 450 transmits a signal from FEB 460 to the LNA 440 in the RX mode. In the TX mode, the TRAS 450 protects the receiver circuit from a high power TX signal by isolating the receiver circuit from a TX path. In the RX mode, the TRAS 450 blocks a noise signal transmitted from the PAB 420 by isolating the transmitter circuit from an RX path. The TRAS 450 may be implemented using an RF switch or a circulator. The TRAS 450 will be described later in detail with reference to FIG. 5.

The status monitor 451 of the TRAS 450 monitors the mode status of the TRAS 450 and provides the TRAS status monitoring signal TSMS to the mode determiner 480.

The FEB 460 includes a band pass filter (BPF). The FEB 460 performs a service band filtering operation on a TX signal received from the TRAS 450, and outputs the filtered TX signal through the antenna 470. Also, the FEB 460 performs a service band filtering operation on an RX signal received from the antenna 470, and outputs the filtered RX signal to the TRAS 450.

The LNA 440 amplifies the signal outputted from the TRAS 450 while suppressing its noise. In the RX mode, the RXB 430 converts an RF signal received from the LNA 440 into a baseband signal according to the fourth control signal TCRX, and outputs the baseband signal to the modem.

As described above, when the TX mode of the PAB 420 and the RX mode of the TRAS 450 operate concurrently or when the RX mode of the PAB and the TX mode of the TRAS 450 are operated concurrently due to a mismatch between the TDD control signals, the mode determiner 480 makes the PAB 420 operate in the RX mode. That is, only when both the second control signal TCPA from the TDD controller 400 and the TRAS status monitoring signal TSMS from the TRAS 450 are the TX mode, the mode determiner 480 enables the amplification operation of the PAB 420. Otherwise, the mode determiner 480 disables the amplification operation of the PAB 420, so that the high power RF signal is not introduced into the receiver block.

Table 1 below represents the on/off operation of the PAB 420 according to the second control signal TCPA and the TRAS status monitoring signal TSMS.

TABLE 1

| | TSMS | |
|---|---|---|
| TCPA | TX mode | RX mode |
| TX mode | PAB ON | PAB OFF |
| RX mode | PAB OFF | PAB OFF |

Figure 5:
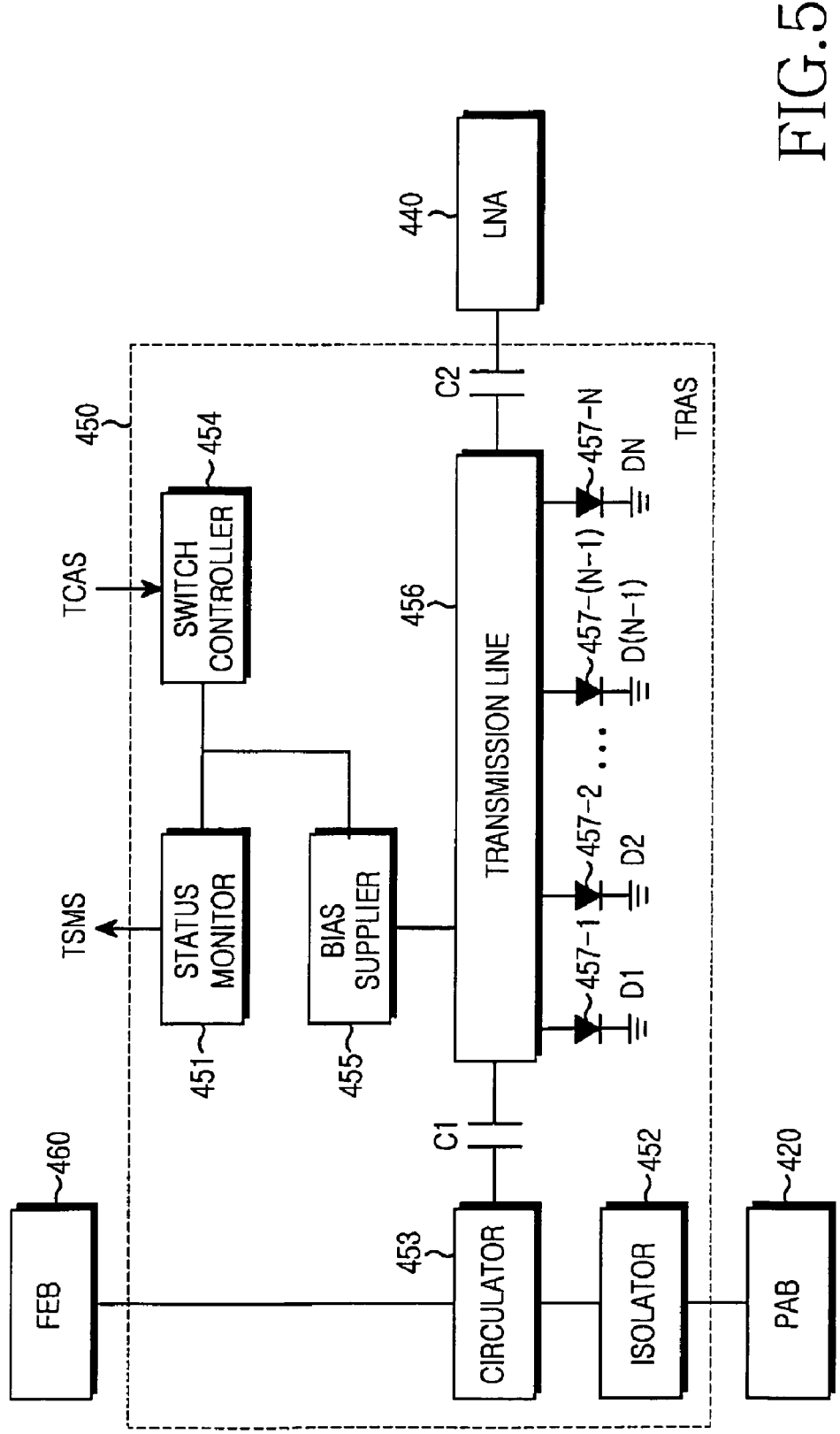
FIG. 5 is a block diagram of a TRAS according to the present invention.

FIG. 5 is a block diagram of the TRAS 450 according to the present invention.

Referring to FIG. 5, the TRAS 450 includes a status monitor 451, an isolator 452, a circulator 453, a switch controller 454, a bias supplier 455, a transmission line 456, and a plurality of pin diodes 457-1 to 457-N.

The isolator 452 is connected to an output terminal of the PAB 420 and protects a termination circuit of the PAB 420. That is, the isolator terminates a signal reflected when an abnormality occurs in an antenna feed line path, or a signal reflected from the transmission line 456. The isolator 452 may be included in the PAB 420.

The circulator 453 transmits the output signal of the isolator 452 to the FEB 460 or transmits the output signal of the FEB 460 to the transmission line 456 according to a determined direction.

The switch controller 454 generates a diode drive signal (DDS) according to the third control signal TCAS output from the TDD controller 400. The bias supplier 455 supplies the diode drive signal (or bias) to the pin diodes 457-1 to 457-N connected in parallel to the transmission line 456. The bias supplier 455 is implemented such that it does not influence the impedance of the transmission line 456 through which the RF signal passes. The pin diodes 457-1 to 457-N are turned on in the TX mode and turned off in RX mode according to the diode drive signal output from the bias supplier 455.

The status monitor 451 detects a voltage of the diode drive signal output from the switch controller 454 and outputs the TRAS status monitoring signal to the mode determiner 480.

A part of the transmission line 456 and the pin diodes connected thereto operate as a reflection block, and the others operate as an RF switch. In the TX mode, the reflection block performs a reflection operation and the RF switch is turned off. Therefore, the RF signal from the circulator 453 is not transmitted to the LNA 440. At this point, the signal reflected from the reflection block is terminated at the isolator 452. In the RX mode, the reflection block turns off the reflection operation, so that the signal from the circulator is transmitted with small loss. The RF switch is turned off, so that the signal from the reflection block is transmitted to the LNA 440.

Capacitors C1 and C2 connected to the transmission line 456 in front and in rear block the diode drive signal (i.e., DC switching signal) so that it cannot influence other blocks.

It is preferable that an electric length (EL) between the pin diodes 457-1 to 457-N shunted to the transmission line 456 be $\lambda/4$. However, the electric length may be changed according to the number of the pin diodes, the impedance of the transmission line, and the input impedance of the LNA 440. Consequently, optimal parameters are obtained through simulation and then are set.

Figure 6:
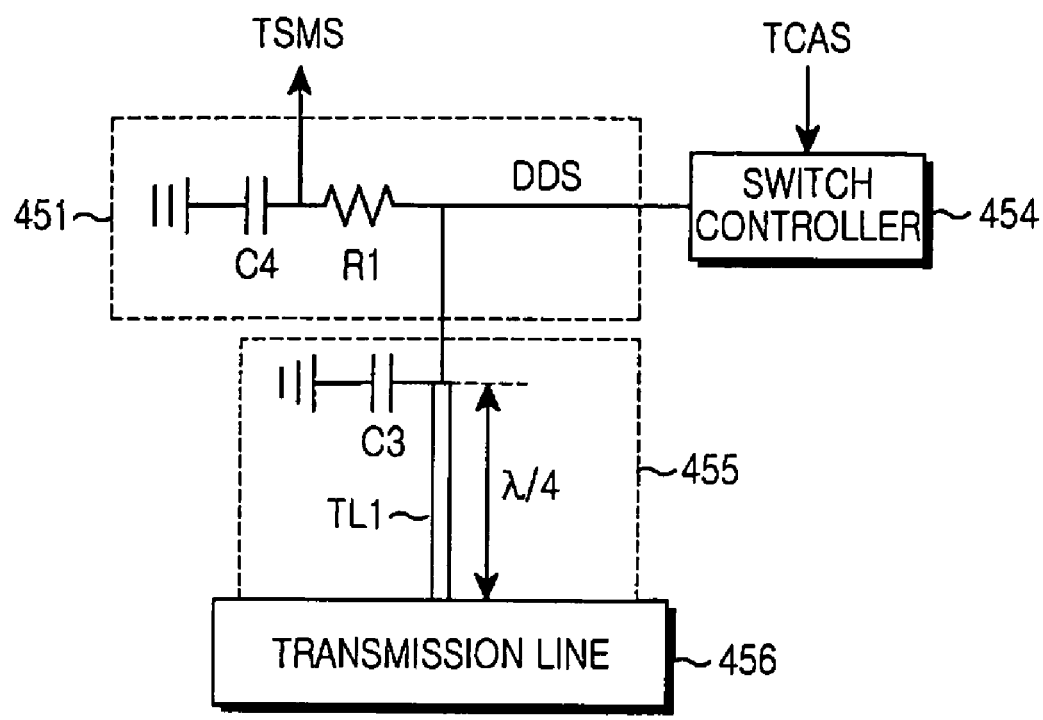
FIG. 6 is a circuit diagram of a status monitor and a bias supplier.

FIG. 6 is a circuit diagram of the status monitor 451 and the bias supplier 455 according to the present invention.

Referring to FIG. 6, the bias supplier 455 includes a transmission line TL1 and a bypass capacitor C3. The transmission line TL1 has a length of $\lambda/4$ and a high impedance, and the bypass capacitor C3 exhibits a short characteristic with respect to the RF signal. The transmission line TL1 has one end connected to an output terminal of the switch controller 454, and the other end connected to the transmission line 456. The bypass capacitor C3 is connected between the one end of the transmission line TL1 and ground.

The status monitor 451 includes a resistor R1 with a high resistance and A capacitor C4. The resistor R1 and the capacitor C4 are connected in series between the output terminal of the switch controller 454 and ground. The status monitor 451 outputs a voltage between the resistor R1 and the capacitor C4 as the TRAS status monitoring signal TSMS. The resistance of the resistor R1 is large enough not to influence the diode drive signal DDS. The capacitor C4 has a capacitance that does not greatly influence a rising time and a falling time of the TRAS status monitoring signal TSMS.

Hereinafter, an operation of the TRAS will be described in detail with reference to FIG. 5.

In the TX mode, it is very important to prevent the high power TX signal from being input to the LNA 440. The TX signal output from the PAB 420 passes through the isolator 452, the circulator 453 and the FEB 460 and then is radiated through the antenna 470 into air.

The pin diodes 457-1 to 457-N shunted to the transmission line 456 are turned on in response to the diode drive signal DDS output from the switch controller 454. In this case, a part of the transmission line 456 and the pin diodes connected thereto totally reflect leakage power supplied from the circulator 453, and the others operate as the RF switch to prevent the RF signal from being input to the LNA. The reflected signal is terminated at the isolator 452 according to the direction of the circulator 453.

Due to the mismatch between the TDD control signals, the PAB 420 may operate in the TX mode, while the TRAS 450 operates in the RX mode. In this case, the status monitor 451 generates the TRAS status monitoring signal indicating the RX mode to the mode determiner 480. The mode determiner 480 recognizes from the second control signal TCPA and the TRAS status monitoring signal TSMS that the PAB 420 and the TRAS 450 are in the TX mode and the RX mode, respectively. In this case, the mode determiner 480 disables the amplification operation of the PAB 420 by generating the gate bias off signal TCRP to the PAB 420.

Figure 7:
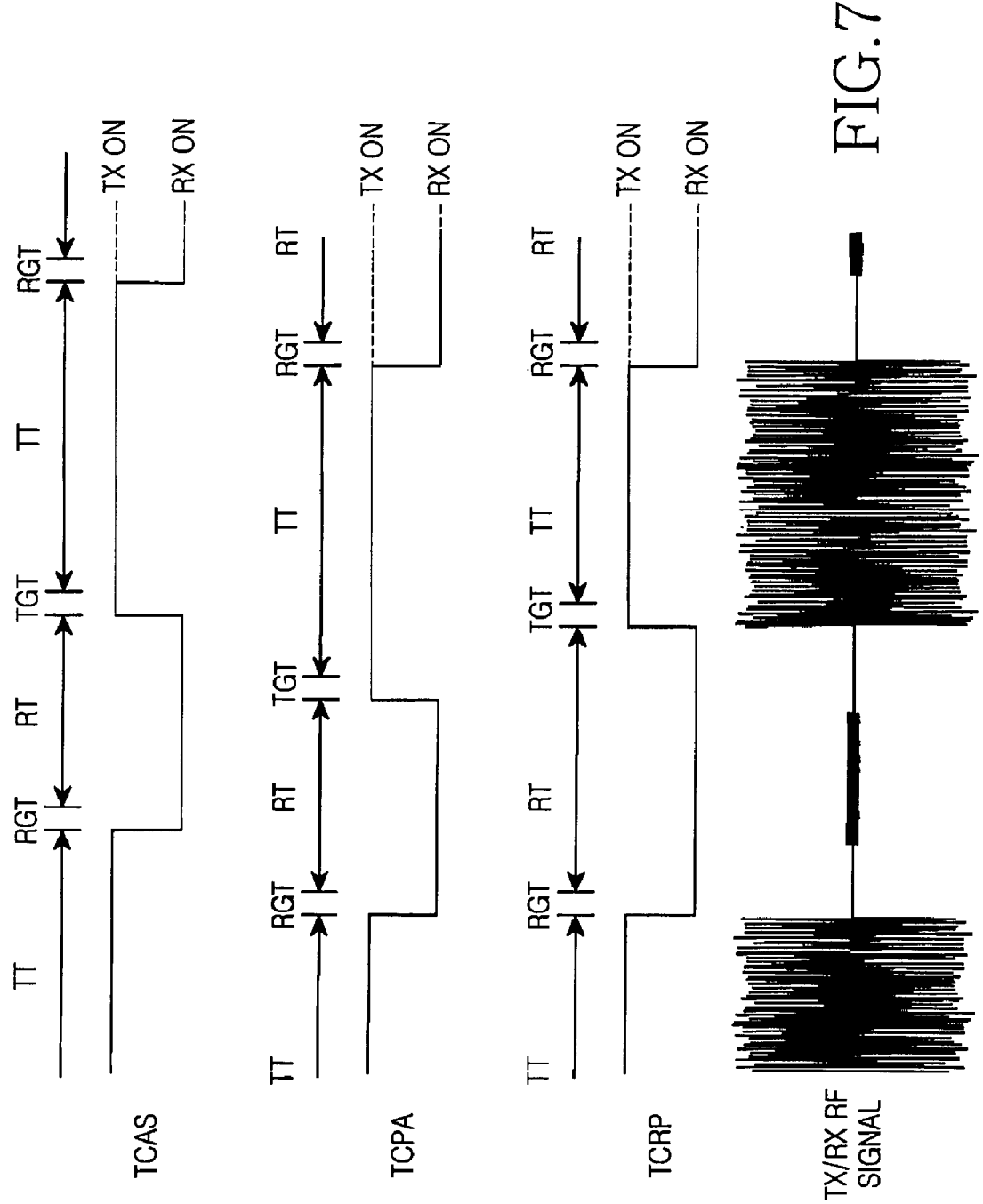
FIG. 7 illustrates a relationship between TDD control signals and TX/RX RF signals.

FIG. 7 illustrates a relationship between the TDD control signals and the TX/RX RF signals in the TDD wireless communication system according to the present invention.

Referring to FIG. 7, when the second control signal TCPA and the third control signal TCAS are not synchronized with each other, the mode determiner 480 generates the fifth control signal TCRP of a low level to the PAB 420, so that the PAB 420 does not operate while the TRAS 450 operates in the RX mode.

In the TDD wireless communication system according to the present invention, the LNA can be protected from being damaged due to the mismatch between the TX signal and the TDD control signals in the system initialization, assembly/disassembly of the boards, and any abnormal environments including the abnormality of the control signal generator. Because the system stability is improved, the system reliability can be improved and the installation costs can be reduced, thereby improving competitiveness.

Although the mode determiner 480 determines the status of the TRAS 450 using the TRAS status monitoring signal TSMS output from the status monitor 451 of the TRAS 450, the status of the TRAS 450 can also be determined using the third control signal TCAS supplied from the TDD controller 400 to the TRAS 450.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for protecting a receiver circuit in a Time Division Duplexing (TDD) wireless communication system, the apparatus comprising:
   an antenna switch for transmitting an output signal of a power amplifier to an antenna feed line and transmitting an output signal of the antenna feed line to a low noise amplifier;
   a status monitor for monitoring a status of the antenna switch; and
   a mode determiner for disabling an amplification operation of the power amplifier when a status monitoring signal output from the status monitor indicates a receive (RX) mode,
   wherein the antenna switch includes:
   a circulator for transmitting the output signal of the power amplifier to the antenna feed line and transmitting the output signal of the antenna feed line to a transmission line connecting the circulator and the low noise amplifier,
   a plurality of pin diodes shunted at predetermined locations of the transmission line, and
   a switch controller for controlling bias of the plurality of pin diodes according to a TDD control signal.

2. The apparatus of claim 1, wherein the mode determiner enables the amplification operation of the power amplifier in a case where both the TDD control signal for controlling the power amplifier and the status monitoring signal indicate a transmit (TX) mode, and the mode determiner disables the amplification operation of the power amplifier in other cases.

3. The apparatus of claim 1, wherein the mode determiner disables the amplification operation of the power amplifier by turning off a gate bias of the power amplifier.

4. The apparatus of claim 1, wherein the status monitor detects a diode drive signal generated from the switch controller and provides the detected diode drive signal to the mode determiner.

5. The apparatus of claim 1, wherein the antenna switch further includes capacitors connected to the transmission line in front and in rear to block the diode drive signal.

6. The apparatus of claim 1, wherein the antenna switch further includes a bias supplier for supplying a diode drive signal generated from the switch controller to the plurality of pin diodes without influence on an impedance of the transmission line.

7. The apparatus of claim 1, wherein an electric length (EL) between the pin diodes is $\lambda/4$.

8. The apparatus of claim 1, wherein the antenna switch further includes an isolator connected between the power amplifier and the circulator to terminate the output signal of the circulator.

9. The apparatus of claim 1, wherein a part of the transmission line and the pin diodes connected thereto totally reflect the output signal of the circulator when the antenna switch operates in the RX mode.

10. An apparatus for protecting a receiver circuit in a Time Division Duplexing (TDD) wireless communication system, the apparatus comprising:
    a circulator for transmitting an output signal of a power amplifier to an antenna feed line and transmitting an output signal of the antenna feed line to a switch;
    the switch for reflecting the output signal of the circulator according to a TDD control signal, or transmitting the output signal of the circulator to a low noise amplifier without loss; and
    a mode determiner for enabling or disabling an amplification operation of the power amplifier according to a status of the switch and the TDD control signal for controlling the power amplifier.

11. The apparatus of claim 10, wherein the mode determiner enables the amplification operation of the power amplifier in a case where both the TDD control signal for controlling the power amplifier and the status of the switch indicate a transmit mode, and the mode determiner disables the amplification operation of the power amplifier in other cases.

12. The apparatus of claim 10, wherein the mode determiner disables the amplification operation of the power amplifier by turning off a gate bias of the power amplifier.

13. The apparatus of claim 10, wherein the antenna switch further includes an isolator connected between the power amplifier and the circulator to terminate the output signal of the circulator.

14. The apparatus of claim 10, further comprising a TDD controller for generating the TDD control signal for controlling the switch, and the TDD control signal for controlling the power amplifier.

15. The apparatus of claim 10, wherein the switch includes:
a transmission line connected between the circulator and the low noise amplifier;
a plurality of pin diodes shunted at predetermined locations of the transmission line;
a switch controller for controlling bias of the plurality of pin diodes according to a TDD control signal; and
a status monitor for detecting a diode drive signal generated from the switch controller and providing the detected diode drive signal to the mode determiner.

16. The apparatus of claim 15, wherein the switch further includes capacitors connected to the transmission line in front and in rear to block the diode drive signal.

17. The apparatus of claim 15, wherein the switch further includes a bias supplier for supplying the diode drive signal generated from the switch controller to the plurality of pin diodes without influence on an impedance of the transmission line.

18. The apparatus of claim 15, wherein an electric length (EL) between the pin diodes is $\lambda/4$.

19. A Time Division Duplexing (TDD) wireless communication system comprising:
a switch for transmitting an outgoing signal to an outgoing path in a transmit mode and transmitting an incoming signal to an incoming path in a receive mode;
a status monitor for monitoring a mode of the switch; and
a mode determiner for disabling an amplification operation of a power amplifier when the mode of the switch from the status monitor is the receive mode,
wherein the switch includes:
a circulator for transmitting the output signal of the power amplifier to an antenna feed line and transmitting the output signal of the antenna feed line to a transmission line connecting the circulator and a low noise amplifier;
a plurality of pin diodes shunted at predetermined locations of the transmission line; and
a switch controller for controlling bias of the plurality of pin diodes according to a TDD control signal.

20. A Time Division Duplexing (TDD) wireless communication system comprising:
a circulator for transmitting an outgoing signal to an outgoing path in a transmit mode and transmitting an incoming signal to an incoming path in a receive mode;
a switch for reflecting the output signal of the circulator according to a TDD control signal, or transmitting the output signal of the circulator to a low noise amplifier without loss; and
a mode determiner for enabling or disabling an amplification operation of a power amplifier according to a status of the switch and a TDD control signal.

* * * * *